United States Patent [19]
Crichton et al.

[11] Patent Number: 5,722,072
[45] Date of Patent: Feb. 24, 1998

[54] HANDOVER BASED ON MEASURED TIME OF SIGNALS RECEIVED FROM NEIGHBORING CELLS

[75] Inventors: Paul Crichton, Newbury; Rupinder Singh Oberoi, Wootton Bassett; Howard Thomas, Eldean, all of United Kingdom

[73] Assignee: Motorola, Inc., Schaumburg, Ill.

[21] Appl. No.: 406,439

[22] Filed: Mar. 20, 1995

[30] Foreign Application Priority Data

Mar. 21, 1994 [GB] United Kingdom ............... 9405539.9
Aug. 10, 1994 [GB] United Kingdom ............... 9416186.6

[51] Int. Cl.$^6$ ............................................ H04Q 7/00
[52] U.S. Cl. .......................... 455/437; 455/444; 455/525
[58] Field of Search ............................ 455/33.1, 33.2, 455/33.3, 34.2, 54.1, 54.2, 56.1, 33.4, 67.1, 226.2; 379/60

[56] References Cited

U.S. PATENT DOCUMENTS

| | | | |
|---|---|---|---|
| 5,067,171 | 11/1991 | Kawano | 455/33.2 |
| 5,175,867 | 12/1992 | Wejke et al. | 455/33.2 |
| 5,379,446 | 1/1995 | Murase | 455/33.2 |
| 5,396,645 | 3/1995 | Huff | 455/33.4 |
| 5,499,386 | 3/1996 | Karlsson | 455/33.2 |
| 5,509,051 | 4/1996 | Barnett et al. | 455/33.2 |

*Primary Examiner*—Reinhard J. Eisenzopf
*Assistant Examiner*—Lester G. Kincaid
*Attorney, Agent, or Firm*—Richard A. Sonnentag

[57] ABSTRACT

A method for determining a handover for a mobile station in a multicellular communication system including the steps of measuring received signal parameters received from a serving cell and a plurality of neighboring cells, comparing received signal parameters with a variable threshold value for each of the plurality of neighbor cells, measuring the amount of time, or the number of times, the received signal parameters are above the threshold value for each of the plurality of neighbor cells, and determining handover based on the measurement.

1 Claim, 5 Drawing Sheets

HANDOVER BASED ON MEASURED TIME OF SIGNALS RECEIVED FROM NEIGHBORING CELLS

FIELD OF THE INVENTION

This invention relates in general to a method of determining handovers in a multicellular environment, and more particularly to determining handover in a multicellular environment based on a parameter of an incoming signal from at least one of the neighbouring cells or serving cell.

BACKGROUND TO THE INVENTION

In a cellular environment, at any one time, there is usually one serving cell defined as the cell with the base station that a mobile unit is receiving service from so that the mobile unit may receive and transmit communication and a number of surrounding cells that are referred to as neighbouring cells. The serving cell may also be referred to as the cell that the mobile unit is camped on to.

In a multicellular environment, there may be cells of different sizes where a number of cells of the same size are located within one larger cell (umbrella cell or macrocell). The smaller cells within the umbrella cell may be called microcells. Microcells are created in a dense population of users to allow a greater capacity of users on the cellular system. The microcells facilitate the reuse of frequencies over a smaller distance. Thus, a mobile unit may be located within a microcell as well as an umbrella cell.

Typically, rural areas that do not have a large number of users or do not require a large capacity only need to be divided into larger cells. As the areas grow or the cells get closer to densely populated areas, the larger cells do not have the capacity to facilitate the increased number of users. There are not enough frequencies allocated. So microcells are created within the larger cells and the larger cells become umbrella cells. This allows frequency reuse among the microcells. Such microcellular techniques improve spectral efficiency and increase the capacity of the cellular network.

Microcells have disadvantages. One disadvantage is that in microcellular areas the number of handovers increases and the time available to make handover decisions decreases. For example, having too many smaller size microcells in an area where there is a fast moving mobile, the fast moving mobile travels through a number of microcells in a short amount of time causing a number of handovers to be processed. Increasing the number of handovers in a short amount of time decreases the call reliability and increases the number of breaks in communication, thus, reducing the quality of communication and in extreme cases, loses calls.

Thus, a fast and reliable method of determining when to handover in a multicellular environment needs to be established. One such method has been proposed in co-pending UK Patent Application No. 9324428.3 entitled "Method for Determining Handover in a Multicellular Environment" filed on Nov. 27, 1993 by Motorola. A related co-pending application that the present application claims priority from is UK Patent Application no. 9405539.9 entitled "Method for Determining Handover Candidate in a Multicellular Environment" filed on Mar. 24, 1994 by Motorola.

Digital cellular communications systems, such as the GSM (Global System for Mobile Communications), integrate a large number of cells in a microcellular environment. It is required in GSM that a mobile station report a received signal level strength of its six strongest neighbouring cells.

Current handover techniques choose a handover candidate from one of the strongest neighbouring cells. In a microcellular environment where the signal strengths are varying rapidly, a cell may produce a strong signal level strength in one measurement report and then a weak signal level strength in a next measurement report. Thus, making a handover decision based solely on a first report of signal strengths may result in selecting a base site that would not be a reliable serving cell for the mobile station.

Furthermore, in Phase One GSM there is no scheme to support an overlay macrocellular network and an underlay microcellular network in terms of handovers between the macrocells and the microcells.

Presently, a mobile station monitors the signal strength of a number of neighbour cells and reports this information on a regular basis to the serving base station. The cells that the mobile station monitors is determined by the Basestation Allocation (BA) list sent to it by the base station.

In Phase One GSM systems and Phase Two GSM systems the process of determining the need for a handover and the selection of the best candidate is separate. In such systems there are two methods that are used to determine that a handover is required:

1) The average signal level falls/link quality/time delay . . . below programmable thresholds;
2) The signal strength of neighbour cells exceeds that of the serving cell by a programmable threshold.

The second part of the process is to determine the best handover candidate. It must be separately decided which the best candidate is from those available based on signal strength readings from the serving cell and a number of candidate base stations.

For multicellular environments, it is desirable to make reliable handover decisions based on a number of criteria involving received signal parameters.

SUMMARY OF THE INVENTION

According to the present invention, there is provided a method for determining a handover in a multicellular communication system including the steps of measuring received signal parameters received from a serving cell and a plurality of neighbouring cells, comparing received signal parameters with a variable threshold value for each of the plurality of neighbour cells, measuring time received signal parameters are above threshold value for each of the plurality of neighbour cells, and determining handover based on the measured time.

In an alternative embodiment the method includes measuring for a period of time a number of times the received signal parameters are above threshold value for each of the plurality of neighbour cells and determining handover based on the number of times.

In a further embodiment the method include measuring for a period of time a number of times the received signal parameters are above threshold value for each of the plurality of neighbour cells and determining handover based on the measured number of times.

DETAILED DESCRIPTION OF THE PREFERRED EMBODIMENT

Figure 1:
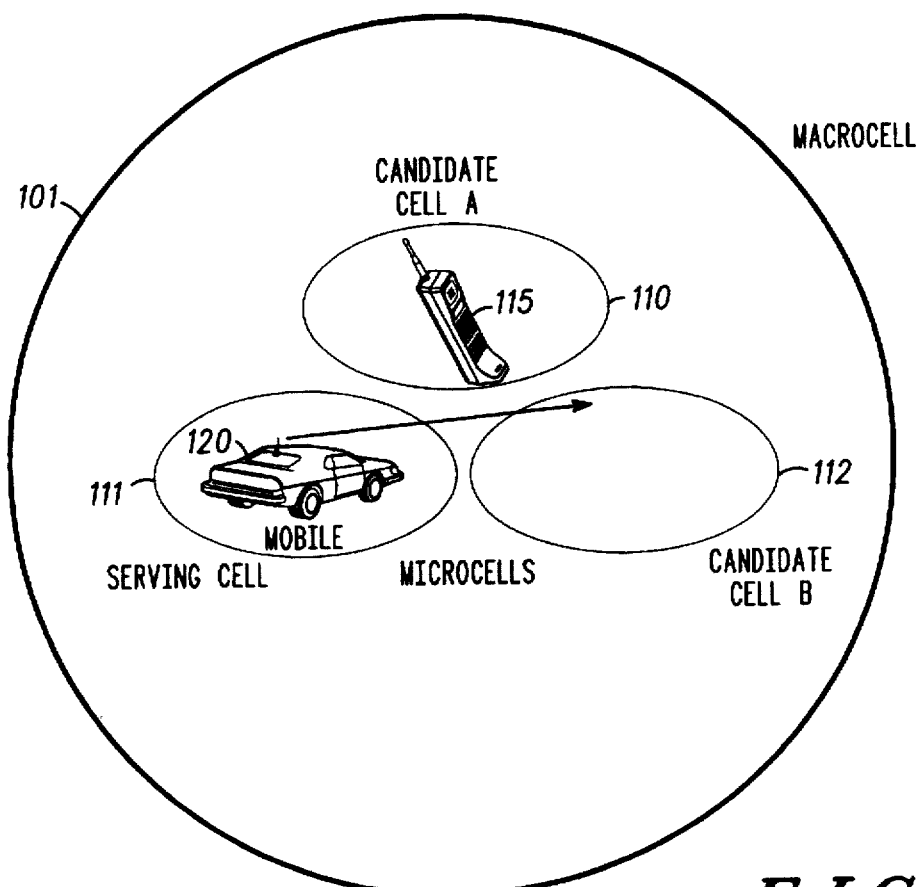
FIG. 1 illustrates a multicellular environment.

Referring to FIG. 1, a multicellular (or microcellular) environment is shown comprising at least one macrocell (or umbrella cell) 101 and a plurality of microcells 110, 111, 112. Each cell includes a base station typically located in the geographic area covered by the cell although, for the sake of clarity, only a single base station 115 is shown in microcell 110. The configuration of the base station 115 determines the size and capacity of the cell 110, since each base station supports a number of carrier frequencies that sustain radio communication links with mobile stations in the cell and the output power from the base station determines the cell radius, as will be readily appreciated. A communication system may include different sized cells as well as a mobile station 120 which may be receiving service from either a base station of the macrocell 101 or a base station of one of the microcells 111. Receiving service from a particular base station in terms of being able to receive and transmit calls is also referred to as being camped on that particular base station. When a mobile station enters the multicellular environment a decision should be made to determine whether to remain being served by the current cell type or handover to a new cell type. The decision may be dependent upon the speed of the mobile unit.

Two cases may be defined when a mobile station is in a multicellular environment or coverage area. The mobile unit may be moving at a high speed or at a slower speed.

When a fast moving mobile station is in a microcellular environment it is desirable that the mobile station remains on the macrocell 101 to alleviate the number of handovers that would be required in a short amount of time.

On the other hand, when a slow moving mobile station is in a microcellular environment it is desirable that the slow moving mobile station is handed over to a microcell 111. This ensures that the macrocell does not become congested and the maximum traffic is handled by the microcell.

Thus, according to one embodiment of the present invention when the mobile station 120 enters a microcellular environment the received signal parameters received from the serving cell and a plurality of neighbouring cells are measured at the mobile station 120 and sent to the serving cell base station. The received signal parameters are compared with a respective variable threshold value for each of the plurality of neighbour cells. Then a duration of time is measured time corresponding to how long the received signal parameters are above the respective threshold value for each of the plurality of neighbour cells. Thus, a reliable handover or handover candidate may be determined based on the measured time.

An alternative embodiment of the present invention includes measuring for a period of time a number of times the received signal parameters are above threshold value for each of the plurality of neighbour cells or a percentage of time that the received signal parameters are above the threshold value and determining handover or handover candidate based on the measured number of times or percentage.

Similarly, a further embodiment includes calculating an average of time or an average of the received signal parameter exceeding the respective threshold value.

The method of the present invention may also include taking into account the actual or absolute received signal parameter as well as any history available.

The received signal parameter may be a received signal level, a power level control signal or a timing advance signal.

The method of the present invention may be used for determining a requirement to handover or determining an ordering of a priority of handover candidates or both.

The method of the present invention proposes that a timer be started when the mobile station sees that the received signal parameter, such as the signal strength, of a neighbouring cell is above a programmable level or a variable threshold value. The neighbouring cell may be the serving cell or a candidate cell.

The variable or programmable threshold value is used to start a timer and may be different for each cell. Likewise, a different timer may be associated with each cell. Both the threshold value and the time may be predetermined or adaptively defined.

In a preferred embodiment of the present invention, the timer keeps running while the measured received signal strength level is above the respective cell's threshold value.

The following are examples of criteria in GSM which may be used to determine if a particular cell received signal level is above a threshold value.

A cell has been continuously being reported in the mobile measurement reports (e.g., SACCH multiframes) and exceeding some programmable threshold over the time Tn. Under this condition the neighbouring cell has the highest probability to be a good handover candidate but it may not take into account fast changes in RXLEV due to fading, shadowing etc.

The cell has been reported at least n out of m times in the mobile measurement report and exceeding some programmable threshold over the time Tn. This method takes into account any fast changes in RXLEV in the neighbouring cell reporting and therefore has a high probability of identifying a good handover candidate. The values of n and m may be optimised for each cell.

The average RXLEV of the cell exceeds a threshold over the time Tn. This method averages out all the peaks and troughs of RXLEV but may not give a very accurate indication of a handover candidate because values are changing so rapidly.

The signal strength threshold could be set such that candidate cells are monitored well before the candidate cell is higher than the serving cell. This would allow microcells to be monitored in advance of time when a handover is required, and make a more informed macrocell/microcell handover decision.

The timer value indicates the length of time that a cell has been a good candidate. The longer this time then the more likely that it is to be a good candidate cell. Mirocells will only appear as good cells if sufficient time is spent in the cell (a mobile user is travelling slowly or the cell is a macro cell). RF planning could be used to encourage mobiles onto microcells.

In addition to having a threshold set at which a serving cell indicates that a handover is required due to very poor serving cell signal levels the present invention provides that predetermined (or variable) levels of neighbour cells could be used to indicate that a handover is requested.

Thus, a handover candidate may be determined by the present invention. One possible implementation is that for a cell not to be considered as a handover candidate unless it has been one of the strong cells (RXLEV exceeds given programmable signal level threshold) for a give time Tn. A timer Tn is associated with each cell. It can be different for each of the cells and is defined by the user in the database. The signal level threshold could be different for each cell.

Figure 2:
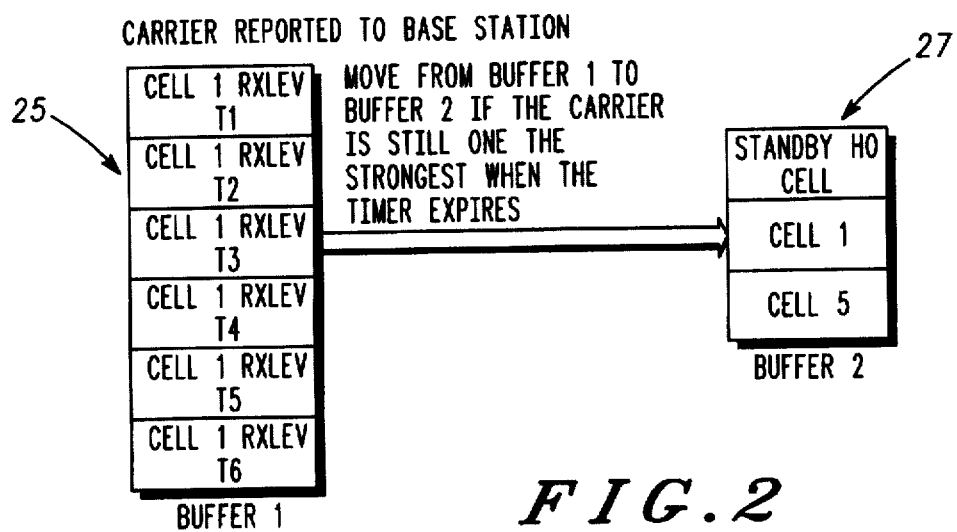
FIG. 2 illustrates a buffer arrangement for an embodiment of the present invention.

FIG. 2 shows one way in which the timer $T_n$ may be used in determining a handover candidate. In FIG. 2 the mobile station reports the strongest neighbour carriers in terms of received signal levels to the base station. The system controller of the base station puts them in a first buffer 25 and starts a time $T_n$. If at the expiry of the timer $T_n$ the cell is still one of the six strongest carriers than it is moved to a second buffer 27 as one of the handover candidates.

Using this method the handover candidate list should always contain at least one cell which is the Standby Handover Cell. Standby Handover Cell is defined as a cell which is cell barred for normal call origination, but is available for any emergency handovers. It may be one of the macrocells (or certain timeslots in a given macrocell). This will ensure that in the cases where a handover is required but there are no suitable microcells available, then the call can be handed over without it being dropped.

RXQUAL and any other criterion currently used in the handover algorithm may also need to be satisfied if the cell is to be considered as handover candidate.

The ordering of the priority of the candidate cells could be determined by the following parameters: values of C1 for each cell, the absolute signal strength of the candidate cells and the serving cells, the value of the timers for each of the candidate cells. The decision could be made on the current values of each parameter or multi-parameter trends could also be used.

Alternatively, the timer does not need to bar the cell being considered as a candidate cell for a period of time. The timer could be used a weighting factor in the ordering of the candidate handover cells. The weighting factor could be any function of time (for example squared law, linear, or exponential).

The decision that a handover is required can be considered as a separate process to that of deciding the best handover candidate cells. An embodiment of the present invention which may be used to determine handover may include any combination of the following: determining that the signal strength of the serving cell is below a programmable threshold, a timer tn expires, and an algorithm to indicate when a handover is required. The handover decision is determined by the value of the timers and the absolute signal levels levels of either the serving cell or the candidate cells.

Figure 3:
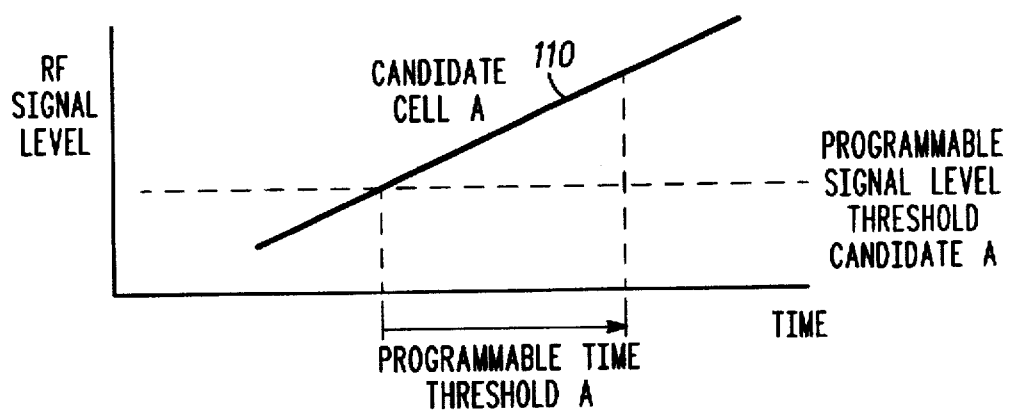
FIGS. 3–5 illustrates signal strength variations when a mobile is moving as indicated in FIG. 1.
Figure 4:
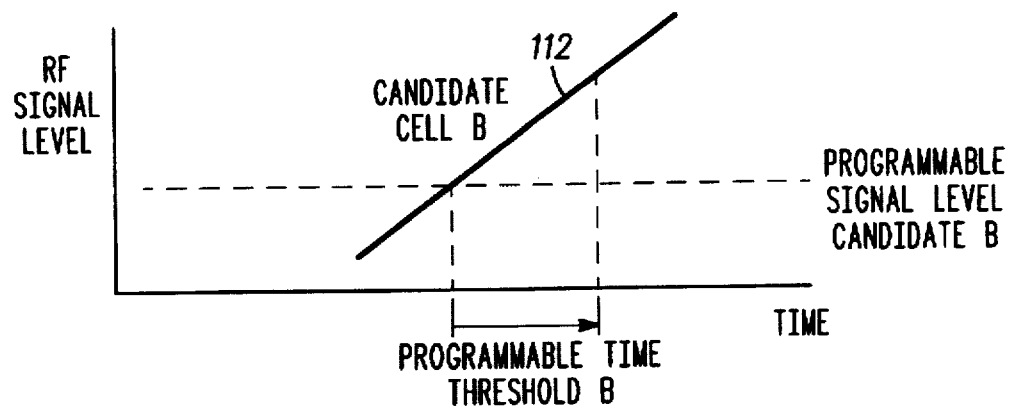
Figure 5:
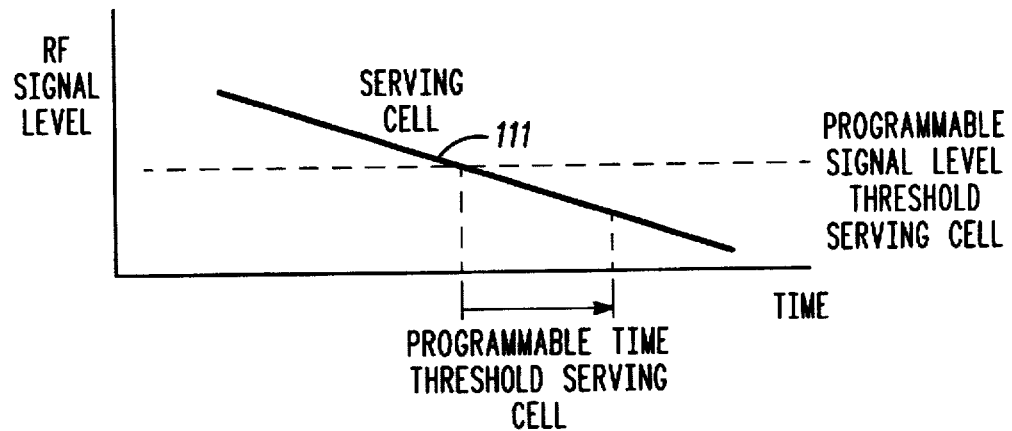

FIGS. 3–5 show the signal strength variations when the mobile is moving along the direction indicated by the arrow in FIG. 1. FIG. 3 shows that a received signal level increases for cell A 110 as the mobile 120 travels in the direction as indicated. The received signal level for cell A 110 steadily increases for a time shown on the horizontal axis as a respective programmable time threshold A.

FIG. 4 shows that a received signal level for cell B 112 is above its respective threshold value (level) and steadily increases for its respective programmable time threshold B. The rate of the received signal level of cell B is increasing faster than the rate of the received signal level of A. Thus, cell B may have a higher absolute value for a received signal level while the programmable time for cell A is longer.

FIG. 5 shows the received signal level for the serving cell 111 decreasing as the mobile station moves as indicated. The received signal level of the serving cell drops below its respective threshold level and steadily decreases for its respective programmable time.

Figure 6:
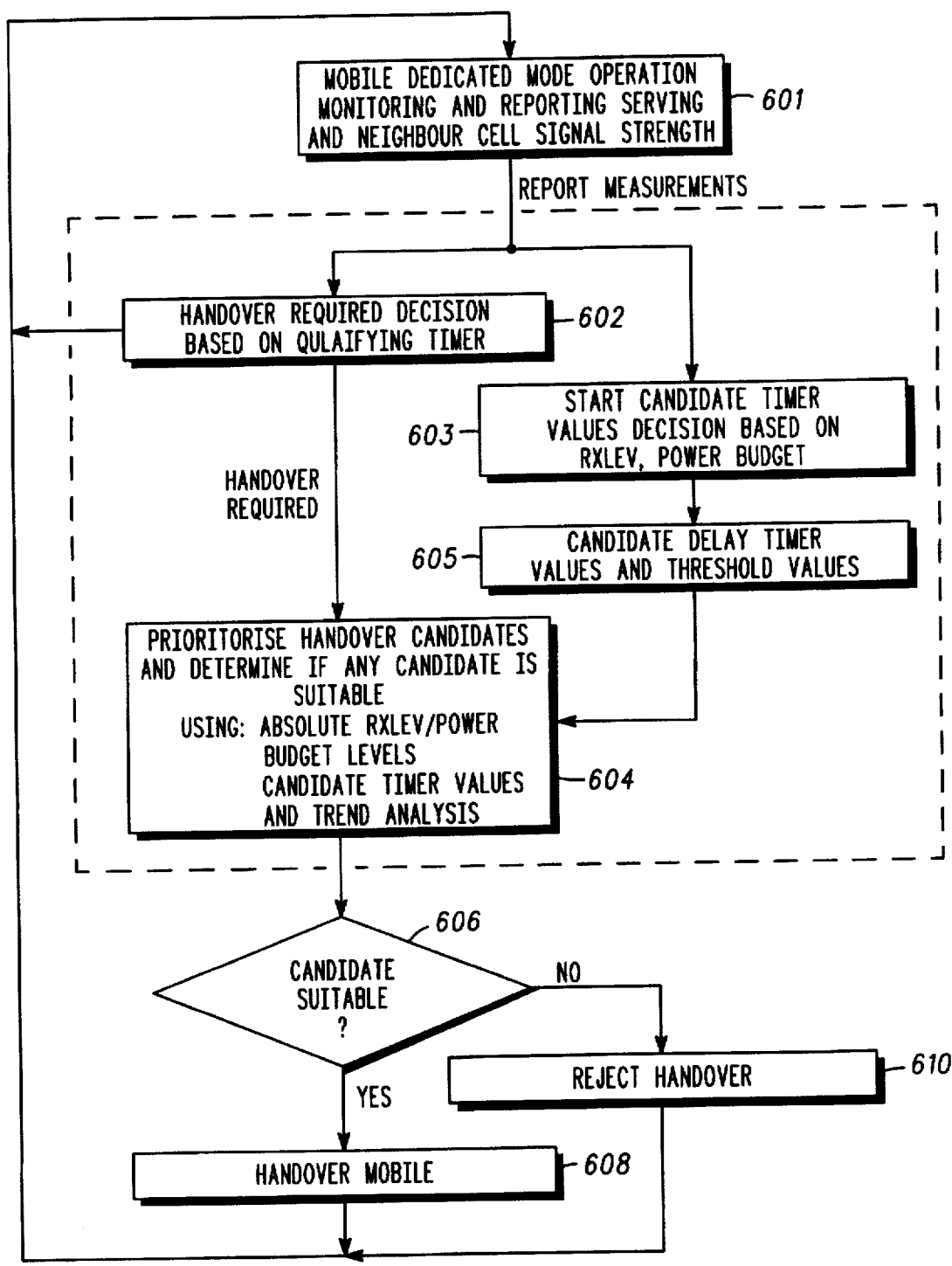
FIG. 6–8 illustrate flow charts for embodiments of the present invention.

FIG. 6 illustrates a flow chart for an embodiment of the present invention. Particularly, in dedicated mode operation a mobile station is monitoring and reporting serving and neighbouring cell signal strengths and link quality as in step 601. The mobile station reports the measurements to the base station and whether a handover is required is determined based on a qualifying timer algorithm as in step 602 and further defined in FIG. 7. A qualifying timer algorithm includes such as are known in GSM and trend analysis as well as that described in accordance with the present invention in FIG. 7.

If a handover is required as determined by a qualifying timer algorithm in step 602, then it is determined as in step 604 which candidates if any are suitable.

Another method is continuously monitoring the measurement reports from each neighbour cell as in step 603.

The ordering or prioritising of handover candidates as in step 604 may be done simultaneously and independently of determining whether a handover is required. Thus, a list of candidates may be constantly generated and updated so that when it is determined that a handover is required handover candidates may be readily available and ordered so the best handover candidate may be handed over to quickly.

Alternatively, the timers used to reorder the priority of handover candidates may be triggered by the handover request from step 602.

Specifically, absolute received signal levels or power budget levels from neighbouring cells may be used in determining whether any cell is a suitable handover candidate. Furthermore, candidate timer values may be used independently for each cell for measuring respective received parameters. Trend analysis may also be used to determine suitable handover candidates and prioritise handover candidates. Particular checks may include minimum RXLEV threshold exceeded availability, Power Budget better than current serving cell and handover margin hysteresis exceeded.

If a suitable handover candidate is determined in step 606 than the mobile station is handed over to the suitable candidate as in step 608. If no suitable candidate is available as determined by step 606 then no handover is performed as in step 610. In both situations the mobile returns to monitoring and reporting as in step 601.

Based on the reported measurements received in step 603, candidate timers are started to determine possible handover candidates as well as possible prioritisation of candidates. The decision to start the candidate timers may be based on received signal levels and power budget signals.

The timer values and respective threshold values are transferred as in step 605 to the method of determining the handover candidates and prioritisation of candidates in step 604. Therefore, the ordering or prioritisation of handover candidates maybe implemented as an independent process initiated when the need to handover is required.

Figure 7:
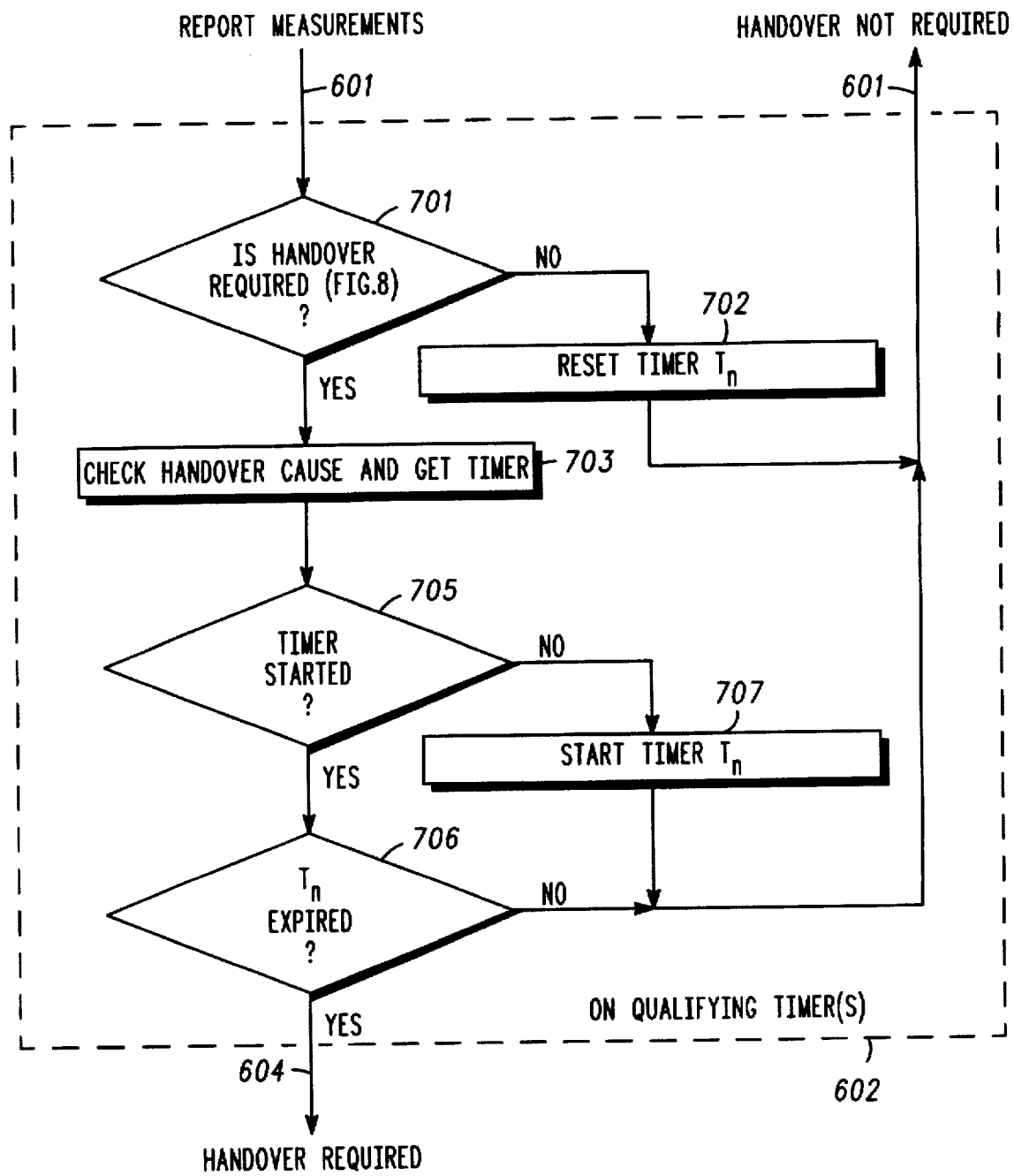

FIG. 7 shows a flow chart that provides a handover required decision based on a timer method as in step 602, according to the present invention. The method is to ascertain, if any, of the many possible handover causes generated by step 701 has been continuously valid for a programmable handover cause dependent delay and thus should generate a Handover Required command.

A Handover Required command shall indicate the cause that led its generation. In the case when several handover cause dependent timers are expired when a Handover Required command is generated, all causes shall be listed. Additionally, the Handover Required command may include all causes which are valid at the time of generation indicating whether or not the associated timers have expired.

Some causes may have zero timer values, for example, if such a cause might indicate that communication could be lost.

An alternative embodiment of the method could include a mechanism to enable timers to be dynamically varied. For example, if some cause or combination of causes, might indicate that a particular kind of handover would be beneficial even if the timer associated with that cause had not expired.

Figure 8:
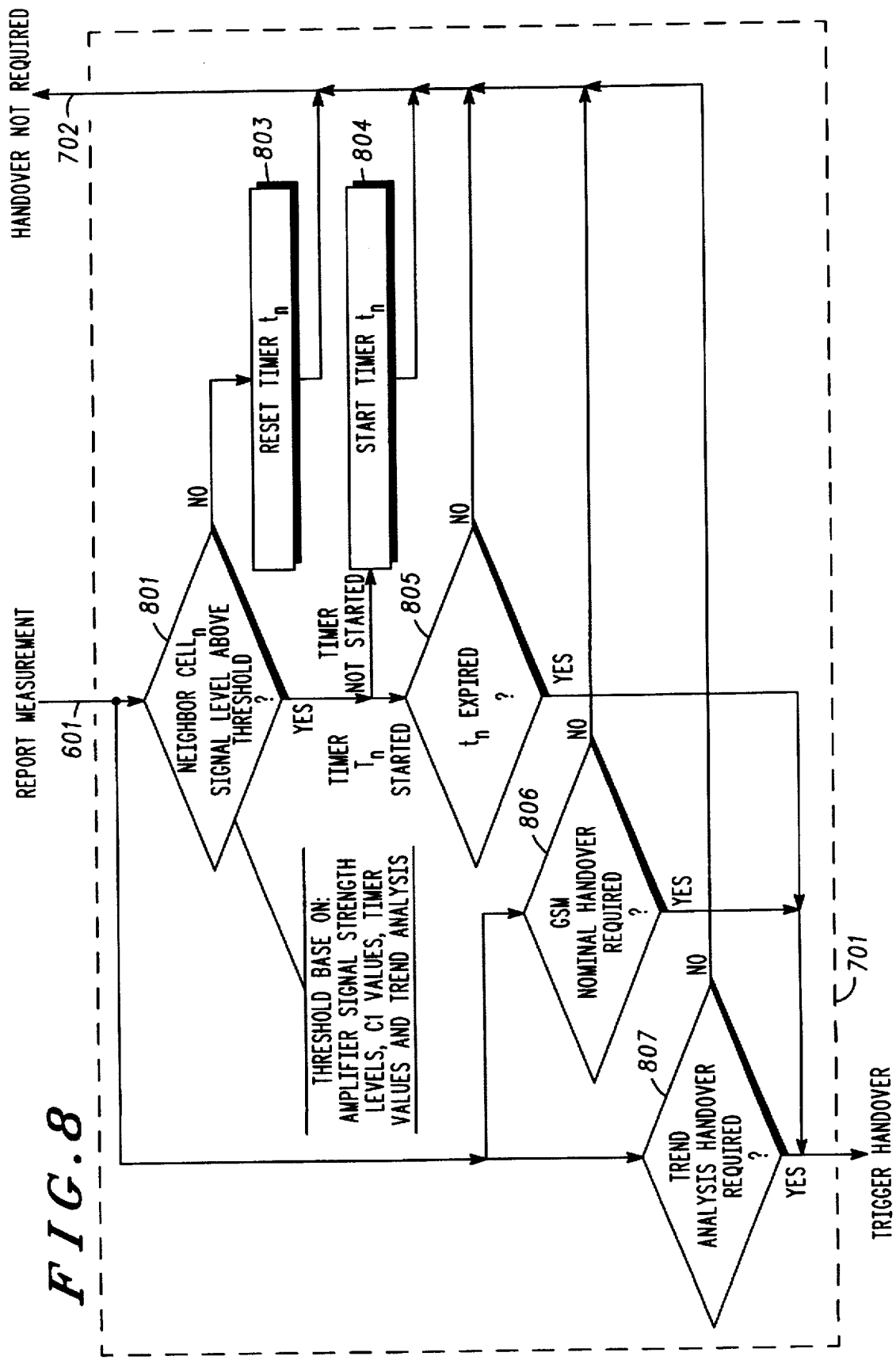

If a handover is required as in step 701 and as further described in FIG. 8 then the handover cause and respective timer is checked as in step 703. If the timer has been already started as determined in step 705 then it is determined whether the timer has been expired as in step 706. If the timer has expired then a handover is required.

If no handover is required as in step 701 then the respective timer is reset and no handover is required.

If the respective timer has not been started as in step 705 then the timer is started as in step 707 and no handover is required.

The timers of FIG. 7 are handover delay timers.

FIG. 8 further describes a method that triggers a handover situation according to an embodiment of the present invention. From the reported measurements it is determined whether the neighbouring cells signal levels are above a threshold value as in step 801. The threshold value may be variable or predetermined and may vary from cell to cell. The threshold values may also be based on absolute signal strength levels, C1 values, timer values and trend analysis.

If it is determined in step 801 that a neighbour cell signal level is above its respective threshold and its respective timer has been started then it is determined whether the timer has expired as in step 805. If yes, then a handover is triggered, if not, no handover is required. The respective timers may be respective neighbour cell signal level timers.

If it is determined in step 801 that no neighbour cell received signal levels are above their respective threshold then the respective timer is reset as in step 803. If a received signal level is above its respective threshold and its respective timer has not been started then the timer is started as in step 804.

Other two independent determinations of whether a handover is required may be made by GSM nominal handover required method as determined in step 806 and trend analysis handover methods as in step 807. The trend analysis method includes signal strength trends and step change methods.

Although the methods of the present invention have been described as being implemented at the base station of the serving cell, the method could actually be implemented in a mobile station provided that the required intelligence is built into the mobile station. The methods could also be implemented at the base station of a neighbouring cell provided the proper information was passed to the base station of the neighbouring cell. As cellular systems expand, methods such as the one of the present invention may be implemented elsewhere in the infrastructure of the system.

In conclusion, the present invention uses programmable and absolute thresholds, elapsed timers and historic information to determine the handover candidates and the target handover cells. Thus, a method is provided for a multicellular communication system, that minimises the number of handovers required an makes efficient handovers decisions. The present invention significantly reduces the number of handovers required and the cellular environment is efficiently utilised. By efficiently utilising the cellular environment, capacity of the cellular communication system may be increased.

We claim:

1. A method for determining a handover candidate in at least one mobile unit communicating with a base station of a cellular radio communication system including a serving cell and a plurality of neighboring cells, wherein the serving cell and the neighboring cells comprise at least one umbrella cell and a plurality of microcells, each cell having a respective base station, the method including the steps of:

measuring received signal parameters for at least some of the neighboring cells of the plurality of neighboring cells;

starting a timer associated with a particular neighboring cell of said at least some of the neighboring cells when the particular neighboring cell has a measured received signal parameter that exceeds a first predetermined threshold;

after a first predetermined period, determining whether the measured received signal parameter for the particular neighboring cell exceeds a second predetermined threshold to identify a requirement for a handover; and in response to the second predetermined threshold being exceeded, generating a prioritized handover candidate list for the at least some of the neighboring cells by applying differing weighting factors between the serving cell and each of the at least some of the neighboring cells, the weighting factors being based on:

received signal strength levels of the at least some of the neighboring cells;

power budget margins between the serving cell and the at least some of the neighboring cells; and elapsed time since starting the timer in the at least some of the neighboring cells.

* * * * *